Figure 1:
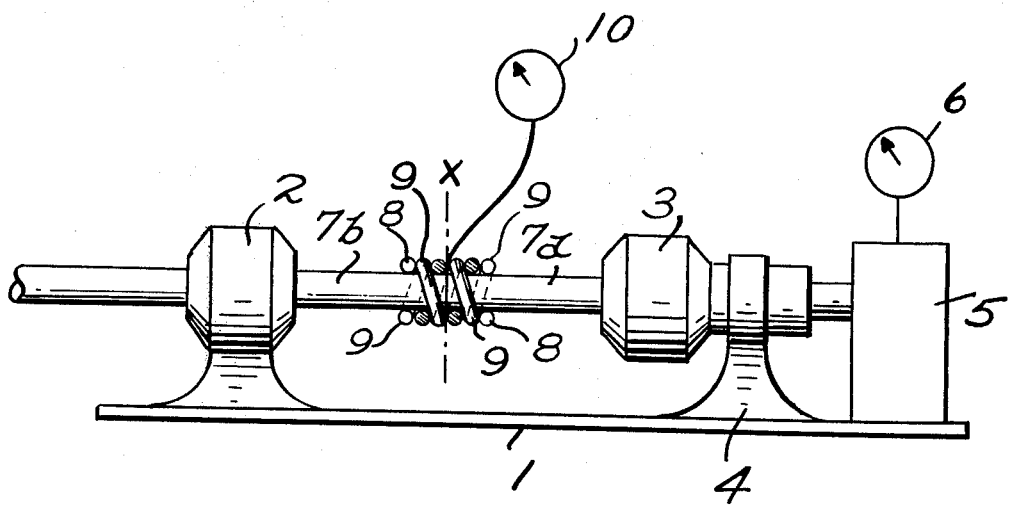

United States Patent

Oshida

[11] 3,963,163
[45] June 15, 1976

[54] METHOD FOR BONDING BODIES MADE OF METALLIC MATERIAL

[75] Inventor: Yoshiki Oshida, Yokohama, Japan

[73] Assignee: Mitsubishi Jukogyo Kabushiki Kaisha, Tokyo, Japan

[22] Filed: Jan. 13, 1975

[21] Appl. No.: 540,413

[52] U.S. Cl............................... 228/196; 228/228; 228/243
[51] Int. Cl.² ................. B23K 13/00; B23K 19/00
[58] Field of Search ............ 228/214, 217, 173, 243, 228/228, 238, 239, 234, 196

[56] References Cited
UNITED STATES PATENTS

| | | | |
|---|---|---|---|
| 3,435,182 | 3/1969 | Rietsch | 148/11.5 R X |
| 3,535,908 | 10/1970 | Hymes et al. | 228/173 X |
| 3,537,171 | 11/1970 | Wilson et al. | 228/114 |
| 3,591,916 | 7/1971 | Arthur | 148/11.5 R X |
| 3,713,207 | 1/1973 | Ruckle et al. | 228/263 X |

Primary Examiner—Al Lawrence Smith
Assistant Examiner—K. J. Ramsey
Attorney, Agent, or Firm—Cushman, Darby & Cushman

[57] ABSTRACT

A method for bonding bodies made of metallic material is described herein, which method is characterized in that one ends of metallic bodies are butted against each other with a light mechanical load applied to the butted portion, and under such a loaded condition the proximity of said butted portion is subjected to a temperature cycle passing over a transformation point of said materials, whereby said metallic bodies may be pressure bonded while super-plastic phenomena are generated in said butted portion of said metallic bodies. In one preferred embodiment, the above-referred loaded condition can be realized without specifically and purposely applying a mechanical force to the bodies to be bonded, but instead one ends of the materials are butted against each other with the main portion thereof maintained in a substantially restrained state, so that the necessary mechanical load to the butted portion may be generated as compression stress based on thermal stress when said temperature cycle is applied to said bodies to be bonded.

10 Claims, 2 Drawing Figures

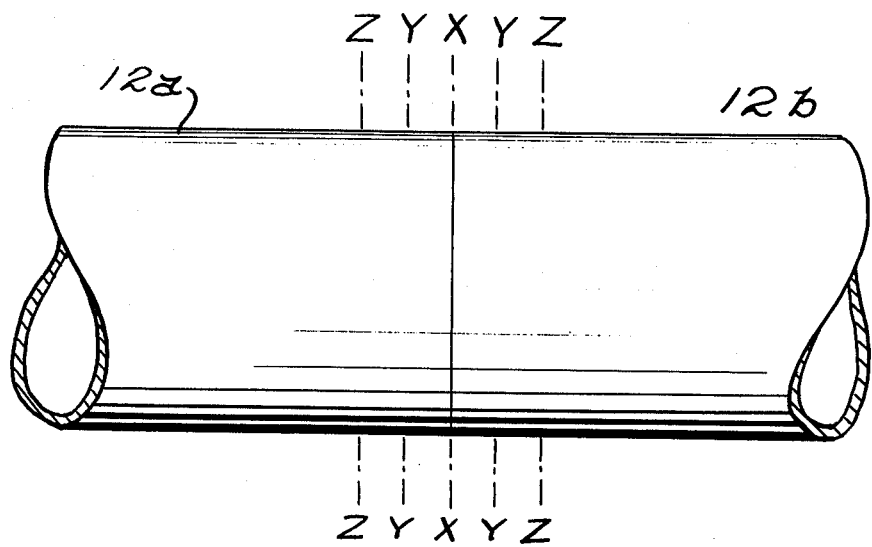

METHOD FOR BONDING BODIES MADE OF METALLIC MATERIAL

The present invention relates to a novel method for bonding bodies made of metallic material by making use of super-plastic phenomena.

In order to bond metallic bodies, generally a welding process has been employed in which a welding rod is used, and this welding rod and the proximity of the boundary surfaces of the metallic bodies to be bonded are heated until they take molten state, and thereby the boundary surfaces are bonded together.

In such a method, regardless of whether it is an electric welding process or a flush-butt welding process, a part of the metallic body is heated up over its melting point, so that an unfavorable change in metallurgical structure which is inherent to welding, that is, a thermally affected portion is produced, and therefore, such a method in the prior art is extremely disadvantageous with respect to mechanical properties and corrosion-resistivity.

Or else, sometimes it is necessary to apply a large pressure in addition to raising the temperature up to the proximity of the melting point as is the case with diffusion bonding. In this way, the prior art methods involve many problems to be solved.

Still further, in the conventional methods for bonding steel pipes, since welding means is employed, there were the following problems:

In case of steel pipes for use in boilers, regardless of whether they are water feed pipes or superheater pipes, bonding portions always exist midway of a straight pipe and between a straight pipe and a bent pipe. The bonding has been heretofore achieved by welding. However, in case of bonding with welding means, the workers undergo various dangers because the welding work for such type of steel pipes is often carried out at a high position. In addition, the welded portion is heated up to a temperature higher than a melting point of the steel pipe, so that thermally affected portions are generated not only at the welded portion but also over a considerably wide range. In other words, regions having different metallurgical structures would be produced.

It is to be noted that generally an outer circumference of a steel pipe produced for boiler use is, in general, exposed to an atmosphere containing a high sulfur content, and consequently, that sulfur content reacts with water within a combustion chamber upon starting and stopping the boiler, resulting in production of sulfuric acid. The produced sulfuric acid corrodes the steel pipe, and the change in metallurgical structure in the aforementioned thermally affected portions results in an adverse effect of extremely enhancing the corrosion speed. In addition, it is difficult to always obtain a flat smooth surface of the welded portion because slag and the like produced upon welding solidifies in itself on the welded portion. Consequently, there occur variations in flow velocity of the hot water flowing along the inner surface of the pipe, and this often causes turbulence corrosion. As described above, the bonding methods relying upon welding means were associated with various disadvantages.

It is one object of the present invention to provide a novel method for bonding bodies made of metallic material, that is free from the above-referred disadvantages, in which upon bonding metallic bodies, (1) lowering of the necessary temperature and pressure as well as shortening of the working time are achieved, and (2) thermally affected portions are not formed.

A principal feature of the present invention exists in that bonding surfaces of metallic bodies are subjected to a triangular waveform temperature cycle passing over a transformation point and a light mechanical load is applied to the bonding surfaces, whereby pressure bonding may be carried out by making use of super-plastic phenomena.

The above-featured invention has been worked out on the basis of the following observation. That is, during my investigation of the super-plastic behaviors of iron-carbon series two component alloys such as soft steel or common cast steel, it has been observed that the diffusion velocity of carbon is abruptly increased in the proximity of the transformation point. In view of such observed phenomena, the aforementioned metallic bodies have been subjected to a triangular waveform temperature cycle having the transformation point as a middle temperature while applying a low pressure to said materials. Then the aforementioned metallic bodies could be perfectly bonded within a short period of time.

Above-mentioned and other features and objects of this invention will become more apparent by reference to the following description taken in conjunction with the accompanying drawings, in which:

FIG. 1 is a front view of one preferred embodiment of the apparatus to be used for practicing the bonding method according to the present invention, and FIG. 2 is an enlarged partial front view of steel pipes to be bonded according to the present invention.

Referring now to the drawings, FIG. 1 shows an apparatus to be used for bonding metallic bodies according to the present invention, in which at one end of a base frame 1 is mounted a chuck 2, and at the other end of the base frame 2 is mounted another chuck 3 via support leg 4 so as to be slidable in the axial direction and as opposed to said chuck 2.

The above-mentioned chuck 3 is connected to a hydraulic device 5, the axial compression stress applied by said hydraulic device 5 is indicated by a pressure gauge 6 on said hydraulic device. Around bonding portions of metallic bodies 7a and 7b are disposed a heating device 8 and a cooling device 9. In addition, a thermo-couple type of thermometer 10 is connected to said bonding portions so that the temperature at the bonding portions may be measured. It is to be noted that for the heating means, high frequency induction heating or resistance heating by directly passing a current could be satisfactorily used, and for the cooling means pressurized air could be blown to the metallic bodies.

One of the above-referred metallic bodies 7a is grasped by the chuck 3, the other metallic body 7b being grasped by the chuck 2, and while compression stress is exerted upon the bonding surfaces of said metallic bodies by means of the hydraulic device 5, the heating device 8 and the cooling device 9 are alternately and repeatedly actuated to apply a heating and cooling temperature cycle to the bonding portions of the metallic bodies 7a and 7b, and thereby these metallic bodies are bonded.

In one preferred embodiment, as the material of the bodies 7a and 7b to be bonded, SS41 soft steel (Fe – 0.3%C) was employed, and a triangular waveform temperature cycle including the transformation points (723°C. and 830°C.) of this metallic material in the variable range and having an upper limit at 950°C. and a lower limit at 600°C. is applied at a frequency of 4 – 5 cycles/minute to the bonding surface X—X between the metallic bodies 7a and 7b by means of the heating device 8 and the cooling device 9. Then the pressure to be loaded upon the bodies to be bonded is applied to the bonding surface at a pressure of 2kg/mm² by means of the hydraulic device 5. In this way, while super-plastic phenomena are generated on the bonding surface between the metallic bodies, the metallic bodies are pressure bonded. Thereby, a specific component in the metallic material such as, for example, carbon in the case of iron-base alloys diffuses mutually through the bonding boundary surface in the opposite directions, so that the bonding can be achieved easily. Now, one preferred embodiment of the present invention, in which a steel pipe forming one mode of metallic body is employed, will be described hereinunder.

A bonding apparatus according to the present invention as shown in FIG. 1 is employed, and in place of the metallic bodies 7a and 7b are used steel pipes 12a and 12b made of STBA22. Portions of the steel pipes 12a and 12b in the proximity of the bonding surface are shown in FIG. 2, in which the steel pipes 12a and 12b are disposed in such manner that one end surfaces of the steel pipes 12a and 12b may butt against each other. And the respective steel pipes 12a and 12b are fixedly secured by means of suitable chucks or equivalent jigs at the positions represented by lines Z—Z which are separated from the butting surface, that is, the plane X—X by about 20mm in the opposite directions. Then on said X—X plane, compression stress within the limits of elastic proportion presented by the component material of the steel pipes 12a and 12b, for instance, a load of 2kg/mm² is applied by means of the hydraulic device 5. Under such a loaded condition, the proximity of the butting portion delimited by lines Y—Y separated from the plane X—X by about 10mm in the opposite directions, is subjected to a triangular waveform temperature cycle, by means of the heating device 8 of high frequency induction heating type employing a high frequency coil or of resistance heating type by passing a current directly through the bonding portion, and the cooling device 9 of pressurized air blowing type. In more particular, the proximity of the X—X plane is alternately heated and cooled by applying 5 cycles (about 1 minute with respect to time) of triangular waveform temperature cycles, which includes the transformation points (723°C. and 850°C.) presented by the component material of the steel pipes 12a and 12b, and which has its upper limit temperature (950°C.) and its lower limit temperature (600°C.) set at about 120°C. above the upper transformation point (850°C.) and at about 120°C. below the lower transformation point (723°C.), respectively. Thereby the butted portions of the steel pipes 12a and 12b present transformation super-plastic phenomena, and they are bonded to each other through pressure bonding.

According to one aspect of the invention, it has been proposed that the compression stress required upon pressure bonding under a transformation super-plastic state can be exerted upon the butting portion without applying any external force for mechanical loading. In more particular, it has been proposed that regardless of whether a light mechanical load or a heavy mechanical load is to be applied to the butting portion, if the other ends of the metallic bodies opposite to the butting surface are kept in a restrained state, and if the butting portion is alternately and repeatedly heated and cooled by applying a triangular waveform temperature cycle to said butting portion, then the thermal stress generated upon heating and cooling is in itself exerted upon the bonding surface as the required compression stress, and thereby pressure bonding can be conducted by making use of super-plastic phenomena without necessitating to externally apply the compression stress to the metallic bodies.

In practice, one ends of the metallic bodies are butted against each other and the other ends thereof are restrained by any suitable means. Subsequently, a predetermined triangular waveform temperature cycle is applied to the butting portion between the metallic bodies to be bonded from outside of the metallic bodies, by making use of, for example, a high frequency induction heating system employing a high frequency coil or a resistance heating system by passing a current directly through the butting portion, and a cooling system in which pressurized air is directly blown to the butting portion.

More particularly, in case that soft steel (SS41) is used for the metallic bodies, since this material has transformation points at 723°C. and at 850°C., a triangular waveform temperature cycle including these transformation points and having its upper and lower limit temperatures at 950°C. and at 600°C., respectively, is applied to the butting portion between the metallic bodies to be bonded to heat and cool the butting portion. Then, since the metallic bodies are in a restrained state, the thermal expansion and contraction of the same caused by heating and cooling are suppressed, so that in the respective metallic bodies is exerted compression stress caused by the thermal stress. Thereby the butted portion between the metallic bodies presents transformation super-plastic phenomena, and so the metallic bodies are pressure bonded to each other.

In summary, according to the aformentioned aspect of the invention, since the light mechanical load required for generating the super-plastic phenomena need not be specifically applied externally, mechanical means for applying compression stress to the butting portion externally is not necessitated.

In the above-described embodiments of the invention, the upper and lower limits of the temperature range in the temperature cycle were preset at about ±120°C. with respect to the relevant transformation point or points, and the frequency of the temperature cycle was preset at 4 – 5 cycles/minute. The reasons why such values have been selected are because the variations of transformation point or points caused by the changes in the heating and/or cooling speeds and the time required between the commencement and termination of the transformation have been taken into consideration. Upon practicing the present invention, the conditions for the temperature cycle passing up and down through the transformation point or points so as to generate super-plastic phenomena such as, for example, the temperature range and the frequency, can be selected at appropriate values depending upon the nature and shape of the metallic body. The compression stress could be selected at about 1/10 – 1/30 of the yielding point (the maximum durable stress) of the metallic material.

In summary, according to the present invention, upon bonding metallic bodies the working time is remarkably shortened such as, for example, less than 5 minutes as described above, by subjecting the bonding surface to a temperature cycle and by applying compression stress to the bonding surface.

The method according to the present invention is applicable not only to steel but also equally to other metallic materials such as cast iron, aluminum alloy, etc. which have been deemed difficult for bonding in the past, and in case that the method according to the present invention is applied, it is feasible to bond boiler steel pipes of different grades to each other, to restore parts and machines made of cast iron which have become fragile and have broken, and to bond water pipes having a diameter as large as 4m in the field. Besides, any material which has a transformation point, a precipitation hardening effect, a recrystallization effect and an order-disorder transformation, can be bonded with a low pressure within a short period of time, by making use of super-plastic phenomena which are caused by applying a triangular-wave temperature cycle having the temperatures for the above-referred effects within its temperature range. Thus the present invention provides a novel bonding method, and its industrial evaluation is very high. In addition, according to one aspect of the present invention, by utilizing thermal stress for the loading stress that is necessary to generate super-plastic phenomena, the equipment for applying stress to the bodies to be bonded becomes unnecessary, and so economical and efficient bonding can be realized.

In case that the present invention is applied to bonding of steel pipes, the heating temperature is far lower than the melting point of the steel pipes as distinguished from the conventional welding method, so that there is no change in metallurgical structure caused by a thermal effect, but on the contrary, since the crystal grains are fined, improvements in anti-corrosion properties and the like could be expected. In other words, when the bonded pipes are assembled, for example, in a boiler, even if sulfuric acid should be produced around the outer circumference of the pipe bodies, the corrosion caused by the produced sulfuric acid can be greatly suppressed. In addition, since the slag and the like are not produced at the bonded portion as distinguished from the welding method, the bonded portion always show a flat smooth surface, so that the turbulence corrosion can be also prevented. Furthermore, various excellent effects are obtained in that upon welding operation no skill is required and the workers do not undergo dangers as distinguished from the welding method, and in that the bonding can be completed in a far shorter period of time than the welding method.

Although the above embodiments of the present invention have been described mainly with respect to steel pipes, it is a matter of course that the present invention is applicable not only to bonding of steel pipes but also bonding of flat plates to each other, a flat plate to a steel pipe, rods to each other, a rod to a flat plate, etc.

While we have described above the principle of our invention in connection with specific apparatus and specific bodies to be bonded it is to be clearly understood that this description is made only by way of example and not as a limitation to the scope of the invention as set forth in the objects thereof and in the accompanying claims.

What is claimed is:

1. A method for bonding bodies made of metallic materials, wherein the steps comprise:
   placing surfaces of portions of the metallic material to be bonded, in abutting relationship;
   applying pressure to the metallic material sufficient to pressure bond the material with super-plastic flow at heated temperature;
   simultaneously with the application of pressure, alternately heating and cooling the metallic material in the area where the bond is to be formed through a temperature range extending above and below the transformation temperature or temperatures of the metallic material being bonded; and
   continuing said steps of applying pressure and alternately heating and cooling, for a time sufficient to form a permanent bond between the portions of metallic material.

2. A method as defined in claim 1, including: using soft steel as the metallic material.

3. A method as defined in claim 2, wherein said step of applying pressure includes applying a pressure of substantially $2Kg/mm^2$ and said heating and cooling step includes alternately heating to a temperature of about 950°C and cooling to a temperature of about 600°C.

4. A method as defined in claim 1, wherein the step of alternately heating and cooling is cycled approximately 5 times per minute.

5. A method as defined in claim 1, wherein the temperature range is preset at about ±120° above and below the normal transformation point or points of the metallic material.

6. A method as defined in claim 1, wherein the pressure applied is selected from the range of pressure which will produce a stress in the metallic material in the range of about 1/10 – 1/30 of the yield point of the metallic material.

7. A method for bonding bodies of metallic materials wherein the steps comprise:
   placing surfaces of portions of the metallic material to be bonded, in abutting relationship;
   restraining movement of the portions of the metallic material so as to cause sufficient compressive stress in the material due to thermal expansion of the material during heating, to pressure bond the material with super-plastic flow at heated temperature;
   simultaneously with the restraining step, alternately heating and cooling the metallic material in the area where the bond is to be formed through a temperature range extending above and below the transformation temperature or temperatures of the metallic material being bonded; and
   continuing said steps of restraining the material and alternately heating and cooling, for a time sufficient to form a permanent bond between the portions of metallic material.

8. A method as defined in claim 7, including: using soft steel as the metallic material.

9. A method as defined in claim 7, wherein the step of alternately heating and cooling is cycled approximately 5 times per minute.

10. A method as defined in claim 7, wherein the temperature range is preset at about ±120° above and below the normal transformation point or points of the metallic material.

* * * * *